Patented May 17, 1949

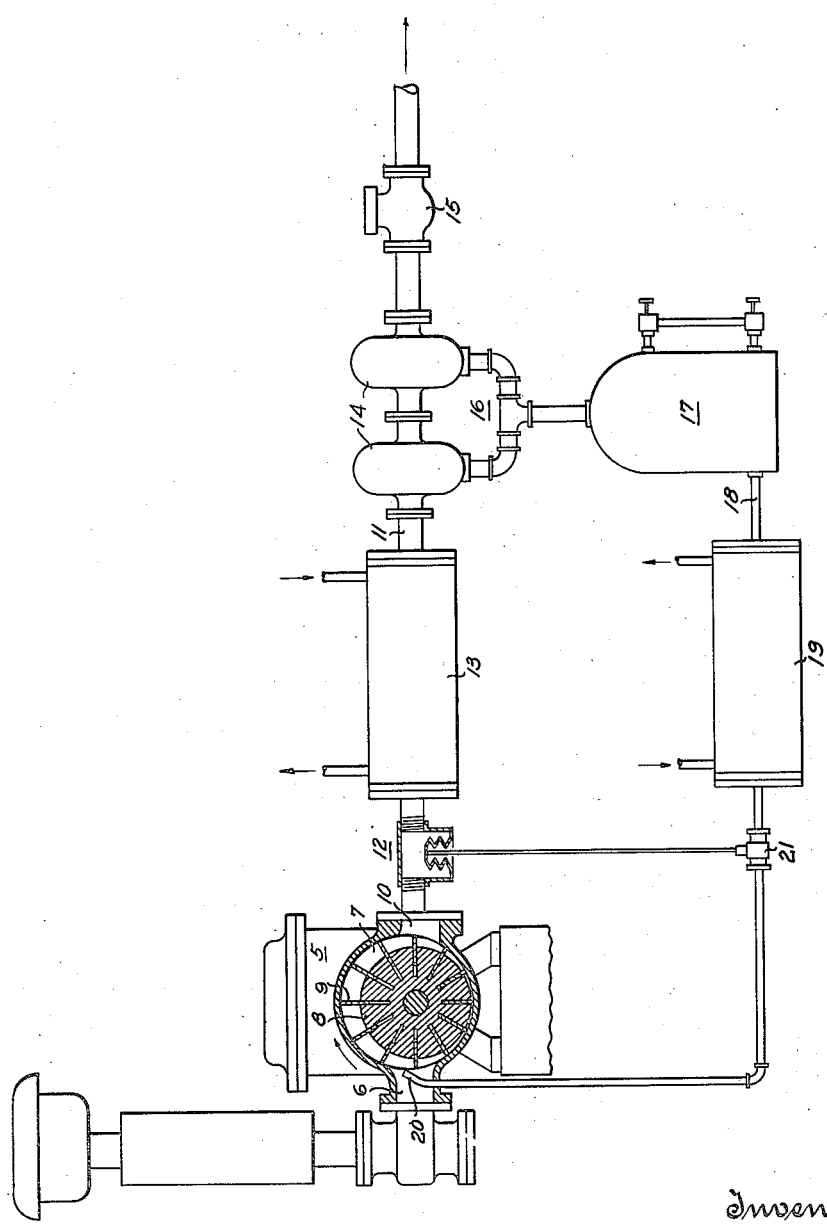

2,470,655

UNITED STATES PATENT OFFICE 2,470,655

COOLING AND LUBRICATION OF COMPRESSORS

Melvin C. Shaw, Wauwatosa, Wis., assignor to Allis-Chalmers Manufacturing Company, Milwaukee, Wis., a corporation of Delaware Application June 12, 1944, Serial No. 539,807

8 Claims. (Cl. 230—207)

The present invention relates generally to improvements concerned with the compressing of gases and more particularly to improvements concerned with air compressor systems and methods of cooling and lubricating the air compressing element thereof.

It has heretofore been proposed to cool and lubricate compressors and the like by introducing ordinary insoluble lubricating oil in diverse quantities directly into the air stream at the inlet end of the compressor for diffusion and distribution of the mixture within the compression chamber so as to effect direct lubrication of the relatively movable parts. After the compressed air and oil mixture passes from the compression chamber, it is ordinarily subjected to a cooling action whereupon a portion of the oil is separated from the air by one of several known methods for re-use in the system. In addition to the relatively poor coooling characteristic of oil, it is extremely difficult to separate ordinary oil from air, and this is especially true if the air and oil have been subjected to heat. Since ordinary oil is a rather inefficient coolant, a considerable amount of such oil must necessarily be passed through the system in order to produce the desired cooling action. The final compressed air produced in these systems, therefore, contains substantial quantities of oil which in many cases is highly undesirable, dangerous, harmful, and uneconomical.

In addition to the above described prior art use of ordinary oil for lubrication by direct injection into the air stream, water has also been used as a cooling medium in various types of compressors. Since water is capable of absorbing a considerable amount of latent heat as it approaches the point of vaporization, it is widely known as an efficient coolant and has naturally been used as such in compressors in various ways, including direct injection of a desired quantity thereof into the compression chamber. Water, however, is a relatively poor lubricant and has an effect of corroding and otherwise injuring various parts of the compressor with which it is brought in contact. The use of water as both a cooling and lubricating means is therefore likewise undesirable from the standpoint of practical results because of the detrimental effects on the compressor and other parts of the system and the resultant high cost of maintenance.

Since ordinary lubricating oil is also insoluble and does not mix readily with water, direct injection of ordinary oil and water into the air inlet of a compressor has only a very limited beneficial lubricating effect, because the water prevents the oil from adhering to the surfaces of the parts sufficiently to adequately lubricate and protectively coat the same, the effect being one wherein the water continuously washes the insoluble lubricating oil from the surfaces requiring lubrication. In addition to this, insoluble oil in such a mixture is inherently difficult to separate from the compressed air, and this difficulty increases as the temperature of the compressed air increases. Hence, the resultant compressed air contains a relatively high quantity of oil even after separation has been effected which in many instances is highly objectionable. In addition to the objectionable presence of oil in the final compressed air product, the continued use and loss of relatively large quantities of oil is also rather costly. Therefore, it has heretofore been necessary to provide separate lubricating and cooling systems for compressors when it became desirable or necessary to obtain substantially oil free air, such compressors being normally provided with forced feed lubrication to the several necessary points, and with separate means for cooling, the latter involving use of water jackets and circulating systems for cooling the compressor by means other than direct injection of the cooling medium into the air to be compressed. It will be apparent that considerable expense is involved in providing separate lubrication and cooling systems of this latter character in order to obtain proper lubrication and cooling as well as substantially clean air.

I have discovered that the above mentioned objections heretofore encountered in cooling and lubricating compressors may be obviated by utilizing a solution of water and water-soluble oil prepared in suitable proportions and injected into the compression chamber for diffusion therein. Relatively small quantities of soluble oil dispersed in an excess of water provides a solution wherein the oil is disseminated sufficiently throughout the water to render the solution an efficient lubricant as well as coolant; and when the solution is distributed within the compressor, it adheres to the various parts to protectively coat and lubricate the same. Since the oil is dispersed in solution with the water, the lubricant is not washed from the various parts, and these parts are continuously protected against rust and are lubricated by the solution whether the compressor be idle or in operation. By supplying suitable quantities of the solution to the compressor, the temperature within the compression chamber may be kept relatively low due to the cooling action of the water and oil solution; and the quantity of the solution supplied to the compressor is preferably regulated automatically by the temperature of the compressed air being discharged from the high pressure end of the compression chamber. The oil remains in solution with the water throughout the process of compression and is discharged with the compressed air; and the solution may be readily separated by ordinary separatingn means from the finally compressed air, the water and oil being separated together as a solution with minimum loss of oil. The compressed air thus produced is substantially oil free air, and the solution recovered from the mixture by separation may be re-used in the system with only very small quantities of soluble oil and water being added thereto from time to time prior to recirculation to replenish the negligible amount lost and to maintain the proper proportions of oil and water in the solution to effect the desired lubricating and cooling.

It is an object of the present invention to provide a simple and efficient system for cooling and lubricating compressors by injecting a solution of coolant and lubricant into the compression chamber together with the fluent medium to be compressed; and a further object is concerned with the utilization of an improved liquid solution which may be directly injected into the compressor for effectively and efficiently cooling and lubricating the same and which may nevertheless be readily and to a maximum degree separated from the finally compressed air.

Another object of this invention is to provide an improved compressor including facilities for efficiently cooling and lubricating the same during operation through the injection of regulated quantities of an oil and water solution.

Another object of the present invention is to provide an improved and highly efficient method of cooling and lubricating compressors wherein a solution of water and soluble oil is injected directly into the compression chamber with the air to be compressed, and as a further feature effectively separating the water and oil from the compressed air for re-use in the system after the compression operation.

Other additional objects and advantages of the present invention will be apparent from the following detailed description.

A clear conception of one embodiment of the present invention and of the mode of utilizing the same may be had through the following description and by reference to the drawing accompanying and forming a part of this specification wherein the various parts are referred to by suitable reference characters.

The single figure shown in the drawing is a diagrammatic view of a sliding vane type of rotary air compressor and other elements of a system providing for the cooling and lubricating of the compressor and the separation of the cooling material from the compressed gas, in accordance with my improved injection method.

Referring to the drawing, the numeral 5 designates generally a compressor of the rotary sliding vane type having an air inlet or suction port 6, a compression chamber or cylinder 7 with a rotor 8 mounted eccentrically therein and provided with vanes 9 slidable radially in slots formed longitudinally therealong, and an air discharge port 10 for delivering compressed air at relatively high pressure. A final air discharge line 11, communicating with the port 10, is preferably provided with a temperature responsive device 12, with a water circulating cooler 13, and with one or more liquid separators 14, respectively. From the separators 14, the compressed air delivery line 11 leads to the air utilizing system past a check valve 15 or the like; and the separators 14 are also connected by suitable piping 16 to a pressure tank and reservoir 17 which is adapted to deliver a solution of coolant and lubricant to the compression chamber 7 through a conduit 18 and past a cooler 19 and a nozzle 20 preferably located at the inlet 6 and directed in the direction of the blade rotation. A regulating valve or device 21 for controlling the solution flowing through the conduit 18 may also be provided at any convenient point therealong, and is preferably connected with the thermo-responsive device 12 for automatic regulation.

In utilizing the compressor and system shown in the drawing in accordance with my present invention, the pressure tank 17 should first be supplied with a solution consisting of a cooling fluid such as water and an oil soluble in such fluid, the amount of oil in the solution ordinarily varying from approximately 2% to 10% by volume for most efficient operation, dependent upon the type of compressor and the conditions under which the compressor is to be operated. The compressor 5 may then be started by revolving the rotor 8 in the direction indicated with the aid of any suitable means such as an electric motor. As the rotor revolves, the sliding vanes 9 are urged outwardly by centrifugal force and contact the inner surface of the cylinder 7, thus producing suction at the inlet port 6 and compressing the air which is drawn within the cylinder 7. The air thus compressed within the cylinder is constantly propelled through the discharge port 10, and considerable heat is naturally produced during this compression operation. During operation of this improved cooling and lubrication system, the soluble oil and water solution from the tank 17 is constantly drawn through conduit 18 to the nozzle 20 and injected directly into the fresh air which is admitted to the compressor at the port 6, and the solution thus introduced is diffused and distributed, thereby effectively cooling and lubricating the several parts. The quantity of cooling and lubricating solution thus produced through the nozzle 20 may be automatically regulated by the thermo-responsive device 12 which is preferably connected to the regulating valve 21 in such a manner as to open this valve so as to admit a greater amount of solution as the temperature of the discharged air rises, and to close the valve so as to admit a lesser amount of solution as this temperature decreases.

When the unit is in operation, fresh air and a regulated quantity of soluble oil and water sufficient to adequately cool and lubricate the compressor 5 is admitted through the inlet port 6. As the air is compressed within the cylinder 7 by the combined action of the eccentrically mounted rotor 8 and slidable vanes 9, the several parts are lubricated and cooled by the oil and water solution, and the air is likewise cooled during compression due to the absorption of heat by the water. The mixture of air, water and oil is continuously discharged through the port 10 and delivered by way of line 11 past the cooler 13 to the separators 14 wherein the soluble oil and water solution is separated from the air. The substantially oil free compressed air continues through the delivery line 11 past check valve 15 for use in the air utilizing system, and the oil and water solution separated from the air is conducted through the piping 16 to the pressure tank 17 for re-use in the system. The proportions of water and oil in the tank 17 may be maintained substantially constant by addition of water and oil in necessary amounts.

I have discovered that extremely efficient cooling and lubricating may be accomplished by the use of a soluble oil and water solution in compressor systems as above described, and the solution is readily separable from the air with utilization of ordinary liquid separators. While the water in the solution does evaporate to some extent and must be replenished from time to time as the proportions of soluble oil and water become undesirable for efficient operation, the loss of oil in the system is negligible. The solution adequately lubricates and inhibits against rust all necessary parts of the compressor, forming a protective coating thereover whether the compressor be operating or idle. The compressed air temperature may be automatically regulated and desirably maintained below the dew point by an automatic regulator as described for controlling the flow of the cooling and lubricating solution to the compressor, thereby providing drier air for process purposes.

While water has heretofore been utilized for direct cooling in compressors of various types, water itself is a poor lubricant and separate means of lubrication has therefore been found necessary in such prior systems; and while ordinary insoluble oil has likewise been used heretofore for compressor cooling and lubrication, ordinary oil is a poor coolant and is moreover extremely difficult to separate from the compressed air, and consequently separate indirect cooling means and water jacketed compressors as well as costly means for attempted separation of the oil from the air have been provided in an effort to overcome the objections. Since ordinary lubricating oil is insoluble in water and since it is extremely difficult to effect a high degree of separation of such oil from the compressed air, the foregoing objections are likewise present when an attempt is made to utilize a mixture of ordinary oil and water for compressor cooling and lubrication by direct injection. By utilizing a solution of cooling fluid and oil soluble in such fluid in accordance with my invention, the solution may be injected directly into the air to be compressed with highly efficient cooling and lubricating effects and may be readily separated from the air for re-use in the system. In addition to the initial saving in manufacturing cost which may be effected by the simplicity of the present system, tremendous savings in normal operating costs are also effected due to the small loss of oil and high degree of separation obtainable by utilizing such a solution for cooling and lubricating purposes; and the cost of lubrication in an actual commercial installation has been reduced by over 90% through utilization of my present invention. The present system and method may be readily utilized with all sizes of compressors and has actually proven highly successful and efficient in commercial use.

While the invention has been shown and described as being especially applicable to a compressor of the rotary sliding vane type, it should be understood that it is not desired to limit the invention to the precise system or method of application herein shown and described for various modifications and applications within the scope of the claims may occur to persons skilled in the art.

It is claimed and desired to secure by Letters Patent:

1. The method of cooling and lubricating an air compressor having air inlet and discharge ports communicating with a compression chamber, which comprises, preparing a composite liquid comprising a solution of water-soluble oil in water, so compounding said liquid that the proportion of water and water-soluble oil is such that if said liquid is injected into said chamber there is at least such an excess of water that the oil will remain in solution in water during the compression process, and such solution will be discharged with the air from said discharge port, and injecting said liquid into said chamber while said compressor is in operation to cool and lubricate said compressor.

2. The method of cooling and lubricating an air compressor having air inlet and discharge ports communicating with a compression chamber, which comprises, preparing a composite liquid comprising a solution of water-soluble oil in water, so compounding said liquid that the proportion of water and water-soluble oil is such that if said liquid is injected into said chamber there is at least such an excess of water that the oil will remain in solution in water during the compression process, and such solution will be discharged with the air from said discharge port, and injecting said liquid into said chamber while said compressor is in operation, at a quantity rate dependent upon the temperature of the discharge from said discharge port, to cool and lubricate said compressor.

3. The method of cooling and lubricating an air compressor having air inlet and discharge ports communicating with a compression chamber, which comprises preparing a composite liquid comprising a solution of water-soluble oil in water, so compounding said liquid that the proportion of water and water-soluble oil is such that if said liquid is injected into said chamber there is at least such an excess of water that the oil will remain in solution in water during the compression process, and such solution will be discharged with the air from said discharge port, injecting said liquid into said chamber while said compressor is in operation to cool and lubricate said compressor, separating the solution from the air discharge from said discharge port, and thereafter reinjecting the separated solution into said chamber.

4. The method of cooling and lubricating an air compressor having air inlet and discharge ports communicating with a compression chamber, which comprises preparing a composite liquid comprising a solution of water-soluble oil in water, so compounding said liquid that the proportion of water and water-soluble oil is such that if said liquid is injected into said chamber there is at least such an excess of water that the oil will remain in solution in water during the compression process, and such solution will be discharged with the air from said discharge port, injecting said liquid into said chamber while said compressor is in operation to cool and lubricate said compressor, separating the solution from the air discharged from said discharge port, adding water to the separated solution to maintain the aforesaid proportion, and thereafter reinjecting the separated proportion-maintained solution into said chamber.

5. The method of cooling and lubricating an air compressor having air inlet and discharge ports communicating with a compression chamber, which comprises preparing a composite liquid comprising a solution of water-soluble oil in water, so compounding said liquid that the proportion of water and water-soluble oil is such that if said liquid is injected into said chamber there is at least such an excess of water that the oil will remain in solution in water during the compression process, and such solution will be discharged with the air from said discharge port, injecting said liquid into said chamber while said compressor is in operaton to cool and lubricate said compressor, cooling the mixture of air and solution discharged from said discharge port, separating the solution from the so-called discharge, and thereafter reinjecting the separated solution into said chamber.

6. The method of cooling and lubricating an air compressor having air inlet and discharge ports communicating with a compression chamber, which comprises preparing a composite liquid comprising a solution of water-soluble oil in water, so compounding said liquid that the proportion of water and water-soluble oil is such that if said liquid is injected into said chamber there is at least such an excess of water that the oil will remain in solution in water during the compression process, and such solution will be discharged with the air from said discharge port, injecting said liquid into said chamber while said compressor is in operation to cool and lubricate said compressor, separating the solution from the air discharged from said discharge port, cooling the separated solution, and thereafter reinjecting the separated solution into said chamber.

7. The method of cooling and lubricating an air compressor having air inlet and discharge ports communicating with a compression chamber, which comprises, injecting a composite cooling and lubricating liquid into said chamber, said liquid comprisng a soluton of water-solubie oil in water, the proportion of water and water-soluble oil having been so selected that there is approximately 2% to 10% of water-soluble oil in said solution.

8. The method of cooling and lubricating an air compressor having air inlet and discharge ports communicating with a compression chamber, which comprises, injecting a composite cooling and lubricating liquid into said chamber at a quantity rate dependent upon the temperature of the discharge from said discharge port, said liquid comprising a solution of water-soluble oil in water, the proportion of water and water-soluble oil having been so selected that there is approximately 2% to 10% of water-soluble oil in said solution.

MELVIN C. SHAW.

REFERENCES CITED

The following references are of record in the file of this patent:

UNITED STATES PATENTS

| Number | Name | Date |
|---|---|---|
| 1,778,447 | Burkhardt | Oct. 14, 1930 |
| 1,834,976 | Schmidt | Dec. 8, 1931 |
| 2,059,856 | Eastman et al. | Nov. 3, 1936 |
| 2,303,136 | Perkins | Nov. 24, 1942 |
| 2,363,273 | Waterfill | Nov. 21, 1944 |

FOREIGN PATENTS

| Number | Country | Date |
|---|---|---|
| 153,292 | Switzerland | June 1, 1932 |
| 409,638 | Great Britain | May 3, 1934 |
| 502,690 | Great Britain | Mar. 22, 1939 |

Certificate of Correction

Patent No. 2,470,655.　　　　　　　　　　　　　　　　　　　　　　May 17, 1949.

MELVIN C. SHAW

It is hereby certified that errors appear in the printed specification of the above numbered patent requiring correction as follows:

Column 6, line 52, claim 3, for the word "discharge" read *discharged*; column 7, line 13, claim 5, for "operaton" read *operation*; line 16, same claim, for "so-called" read *so-cooled*; column 8, line 3, claim 7, for "comprisng a soluton" read *comprising a solution*;

and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*